United States Patent
Tripathi et al.

(10) Patent No.: US 7,460,533 B1
(45) Date of Patent: Dec. 2, 2008

(54) SYSTEM AND METHOD FOR MULTI-CASTING ANNOUNCEMENTS

(75) Inventors: Anoop Tripathi, Mount Prospect, IL (US); Michael D. Homeier, Elmhurst, IL (US)

(73) Assignee: 3Com Corporation, Marlborough, MA (US)

( * ) Notice: Subject to any disclaimer, the term of this patent is extended or adjusted under 35 U.S.C. 154(b) by 1226 days.

(21) Appl. No.: 10/002,832

(22) Filed: Nov. 15, 2001

(51) Int. Cl.
*H04L 12/56* (2006.01)
(52) U.S. Cl. ...................................... 370/390
(58) Field of Classification Search ........................ None
See application file for complete search history.

(56) References Cited

U.S. PATENT DOCUMENTS

| | | | |
|---|---|---|---|
| 5,127,004 A * | 6/1992 | Lenihan et al. ............. 370/525 |
| 5,544,229 A * | 8/1996 | Creswell et al. ........ 379/114.05 |
| 6,011,832 A * | 1/2000 | Rice et al. ................. 379/88.16 |
| 6,347,136 B1 * | 2/2002 | Horan .................... 379/142.01 |
| 6,456,601 B1 * | 9/2002 | Kozdon et al. .............. 370/259 |
| 6,763,003 B1 * | 7/2004 | Petersson ................. 370/310.2 |
| 6,771,639 B1 * | 8/2004 | Holden ....................... 370/352 |
| 6,870,925 B2 * | 3/2005 | Culp .......................... 370/352 |
| 2001/0024965 A1 * | 9/2001 | Hayashi ...................... 455/567 |
| 2002/0025026 A1 * | 2/2002 | Gerszberg et al. .......... 379/67.1 |
| 2002/0058521 A1 * | 5/2002 | Yamada et al. .............. 455/458 |
| 2002/0131575 A1 * | 9/2002 | Gallant .................. 379/220.01 |
| 2002/0136206 A1 * | 9/2002 | Gallant et al. ............... 370/352 |
| 2004/0042479 A1 * | 3/2004 | Epstein et al. .............. 370/432 |

OTHER PUBLICATIONS

Schulzrinne et al., "RTP: A Transport Protocol For Real-Time Applications", RFC 1889, Jan. 1999, pp. 1-75.

* cited by examiner

*Primary Examiner*—Anh-Vu H Ly
(74) *Attorney, Agent, or Firm*—McDonnell Boehnen Hulbert & Berghoff LLP (57) ABSTRACT

A system and method for multicasting announcements in a communication network. An address is established in a memory. Announcements are formed. The announcements are broadcast on the address.

14 Claims, 6 Drawing Sheets

SYSTEM AND METHOD FOR MULTI-CASTING ANNOUNCEMENTS

FIELD OF THE INVENTION

This present invention relates to multicasting information in networks. More specifically, it relates to using servers to multicast announcements.

BACKGROUND OF THE INVENTION

Multicasting is a technique where information, for example, packets of information, from one location may be sent to other locations, without the need for unneeded duplication. For example, in a system that supports multicasting, one packet may be sent from a source and may be replicated as needed in a network to reach as many users as required.

A multicast may use a multicast group and a multicast group address. A sending device may send information to the group address and only members of the group may receive the multicast data. A group address may take any number of forms. For example, the group address may be a class D IP address.

Various protocols have been developed to send information across networks. One example of a protocol across the Internet is the Real Time Protocol (RTP). The RTP provides a framework for sending real time data over the Internet. The RTP is designed to be independent of the underlying transportation protocol. Details of the RTP may be found in RFC-1889, which is promulgated by the Internet Engineering Task Force (IEFT).

Still another protocol used for signaling is the Session Initiation Protocol (SIP). SIP depends on various messages being sent between different entities in a network. For instance, SIP messages may be requests from servers or clients, or responses to a request.

In one example of a SIP system, a caller device may send an INVITE message to a called party device. The message may be transmitted via a single or multiple proxies to the called party device. The proxy may send a "100 Trying" message to the caller party device to specify that action is being taken on behalf of the caller device, but the called party device has not yet being located.

Once the called party device has been located, the called party device may send a "180 Ringing" message to the proxy and the proxy may relay this message to the caller device. This message indicates that the called party device has been located and notified of the call.

Once the request has been successfully processed, a "200 OK" message may be sent from the called party device to the proxy and from the proxy to the caller party. An audio connection between the caller party device and the called party device may now be established.

SUMMARY OF THE INVENTION

The system and method of the present invention advantageously allows an announcement server to play announcements to an address or addresses in a memory. Different announcements may be played to different addresses and a first announcement may be switched substantially immediately to a second announcement. No clipping or dead silence may exist between the first and second announcements.

In one example of the present invention, a system and method for multicasting announcements in a communication network includes establishing an address in a memory. An announcement may be formed and the announcement may be broadcast to the address.

The address may be communicated to a device and the device may retrieve the announcement from the address. The announcement may be a tone, for example, a call-ringing tone or a call-routing tone.

In another example of the present invention, a system for providing multicasting for announcements includes a caller device, a proxy, a called party device, and an announcement server.

The proxy may be coupled to the caller device. The called party device may be coupled to the proxy. The announcement server may be coupled to the proxy.

The announcement server may continuously broadcast selected announcements to an address in a memory. The announcement server may communicate the plurality of addresses to the proxy. The proxy may communicate the address to the caller device. The caller device may retrieve the announcement from the address.

The announcement may be a tone. The tone may be a ringing tone or a call-routing tone. The message may be an INVITE message.

The foregoing and other features and advantages of the system and method for multicasting announcements will be apparent from the following more particular description of preferred embodiments of the system and method as illustrated in the accompanying drawings in which like reference characters refer to the same parts throughout the different views.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Figure 1A:
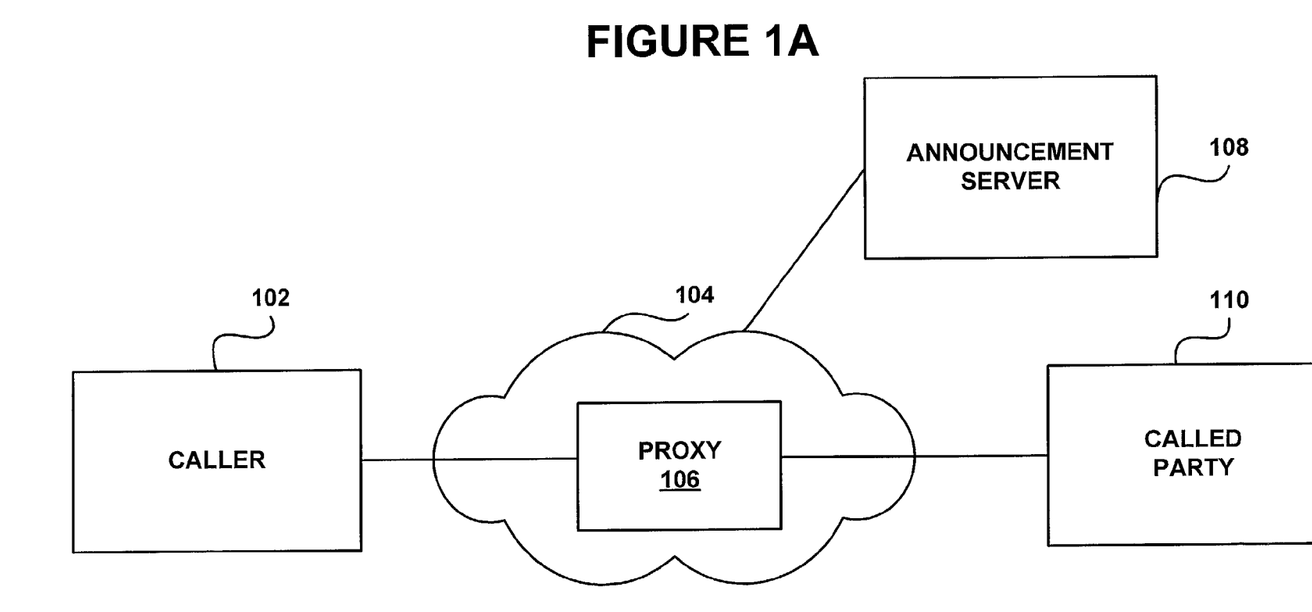
FIG. 1a is a diagram illustrating a preferred embodiment of the system for multicasting information in accordance with the present invention.

Referring now to FIG. 1a, one example of a system for multicasting information is described. A system includes a caller device 102, a network 104, an announcement server 108, and a called party device 110. The network 104 includes the proxy 106. In addition, the announcement server 108 may also reside somewhere in the network 104.

The caller device 102 is coupled to the proxy 106. The proxy 106 is coupled to the called party 110. The announcement server 108 is coupled to the network 104 and can communicate with any device that is coupled to the network 104 or within the network 104.

The caller device 102 and the called party device 110 may be any type of device that may transmit and/or receive any type of information. For example, the caller device 102 and the called party device 110 may be a telephone, personal computer, personal digital assistant (PDA), or cellular telephone. Other examples of devices are possible. In addition, it will be understood more than two devices may be present and coupled to the network 104.

The network 104 may be any type of network that is used to carry any type of information. In addition, the network 104 may be a combination of different types of networks. For instance, the network 104 may be the public switched telephone network (PSTN), the Internet, a wireless network, a packet-switched data network, or any combination of these networks. Other examples of networks and other combinations are possible.

The network 104 may include a proxy 106. The functions of the proxy 106 may be implemented using computer instructions stored in a memory and executed by a processor. The proxy 106 may forward instructions received from one entity to another entity. The proxy 106 may add an RTP destination to the message that it is forwarding from one entity to another entity. For instance, the proxy 106 may supply an address that it has received from the announcement server 108 and use this address as the RTP destination address. The address may indicate where the announcement server 108 is broadcasting announcements. In addition, the network 104 may include any other type of device used to carry information, for example, routers and gateways. Other types of devices within the network are possible.

The functions of the announcement server 108 may be implemented using computer instructions stored in a memory and executed by a processor. The announcement server 108 may supply addresses to the proxy server 106. The proxy server 106 may use the addresses as RTP destination addresses, which are included in messages sent to the caller device 102. The announcement server 108 may also broadcast announcements to addresses. The caller device 102, called party device 110, and any other device may obtain the announcements at the addresses. For example, the caller device 102 may receive messages indicating the address, extract the address, and listen to the announcement at the address.

Announcements may include any type of information and be in any format. For example, the announcements may be ring tones, call-routing tones, call-hold tones, invalid destination tones, temporary unavailable tones, number-is-forwarded tones, and number is posted tones. Other examples of announcements are possible.

The announcement server 108 may play different tones on different multicast addresses. The recipient of an announcement tone may switch immediately to a different announcement (e.g., a different tone) being played at a different address based upon the progress of a call. The announcement server 108 may not have to perform any call setup functions in order for the switch to occur. There is no need for clipping or dead silence before the next announcement is played and there is no delay from the time a signaling state changes and the new announcement is played.

In one example of the operation of the system of FIG. 1*a*, one million Busy Hour Call Attempts (BHCA) are made. Assuming an even distribution of calls, there may be 278 calls-per-second. At least some of these calls may need a call-routing tone for completion. Therefore, since only one call-routing tone would be broadcast to one address, the bandwidth of the call-routing tone is saved for 277 calls. Assuming 90 percent of calls are completed, the ringing-tone is saved for approximately 250 calls. Assuming 5 percent busy calls, 13 calls are saved on the busy tone. In all these cases, a significant amount of bandwidth is saved.

Figure 1B:
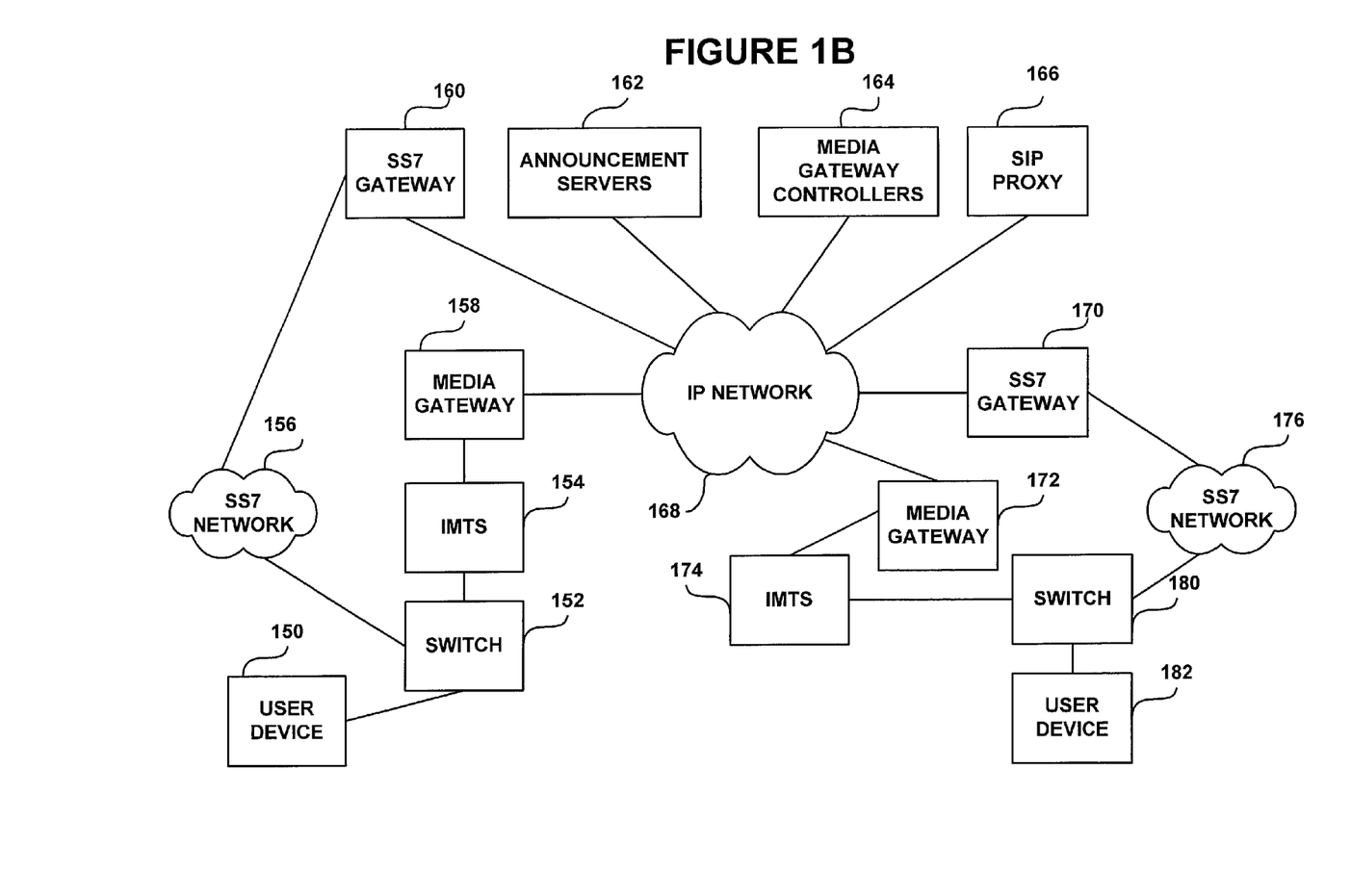
FIG. 1b is a diagram illustrating another example of the system for multicasting information in accordance with the present invention.

Referring now to FIG. 1*b*, one example of a system for multicasting information is described. A system includes user devices 150 and 182, switches 152 and 180, inter-machine trunk lines (IMTs) 154 and 174, SS7 networks 156 and 176, media gateways 158 and 172, SS7 gateways 160 and 170, announcement servers 162, media gateway controllers 164, a SIP proxy 166, and a IP network 168.

The user device 150 is coupled to the switch 152. The switch 152 is coupled to the IMTs 154 and the SS7 network 156. The IMTs 154 is coupled to the media gateway 158. The SS7 network 156 is coupled to the SS7 gateway 160. The media gateway 158 and SS7 gateway 160 are coupled to the IP network 168. The IP network 168 is coupled to the announcement servers 162, the media gateway controllers 164, the SIP proxy 166, the SS7 gateway 170, and the media gateway 172. The media gateway 172 is coupled to the IMTs 174. The SS7 gateway 170 is coupled to the SS7 network 176. The switch 180 is coupled to the IMTs 174, the SS7 network 176, and the user device 182.

The user devices 150 and 182 may be any type of devices that transmit and/or receive any type of information. For example, the user devices 150 and 182 may be a telephone, personal computer, personal digital assistant (PDA), or cellular telephone. Other examples of user devices are possible.

The switches 152 and 180 may be any type of switch used to transfer and switch information. For example, the switches 152 and 180 may be Class 5 switches. Other examples of switches are possible.

The IMTs 154 and 174 may be trunk lines that coupled a media gateway to a switch. For example, the IMTs 154 and 174 may be DS-3 capacity trunk lines. Other examples of IMTs that follow other formats are possible.

The SS7 networks 156 and 176 may be networks that switch control information according to the Signaling System 7 (SS7) protocol. Other examples and types of control networks are possible.

The media gateways 158 and 172 may terminate DS-3 capacity inter-machine trunks (IMTs) from the PSTN. The gateways 158 and 172 may convert circuit-switched voice data (from the IMTs) to packetized voice using Real time Protocol (RTP). The gateways may include VoIP codecs. The VoIP codecs may support various protocols including G.711, G.729a, and T.38. The gateways may be compliant to the decomposed gateway model as proposed in the MEGACO architecture.

The SS7 gateways 160 and 170 may convert circuit switched information from the SS-7 networks 156 and 176 into packetized information, which is transmitted across the IP network 168. This function may implemented by computer instructions stored in a memory and executed by a processor.

The functions of the announcement servers 162 may be implemented using computer instructions stored in a memory and executed by a processor. The announcement servers 162 may supply addresses to the SIP proxy server 166. The SIP proxy server 166 may use the addresses as RTP destination addresses, which are included in messages sent between user devices 150 and 182. The announcement servers 162 may also broadcast announcements to addresses. The user devices 150 and 182, and any other device may obtain the announcements at the addresses. For example, the user device 150 may receive messages indicating the address, extract the address, and listen to the announcement at the address. The announcement servers 152 may be one or multiple servers.

Announcements may include any type of information and be in any format. For example, the announcements may be ring tones, call-routing tones, call-hold tones, invalid destination tones, temporary unavailable tones, number-is-forwarded tones, and number is posted tones. Other examples of announcements are possible.

The announcement servers 162 may play different tones on different multicast addresses. The recipient of an announcement tone may switch immediately to a different announcement (e.g., a different tone) being played at a different address based upon the progress of a call. The announcement servers 162 may not have to perform any call setup functions in order for the switch to occur. There is no need for clipping or dead silence before the next announcement is played and there is no delay from the time a signaling state changes and the new announcement is played.

The media gateway controllers 164 may manage the media gateways 158 and 172 and may be implemented with computer instructions stored in a memory and executed by a processor. For example, the media gateway controllers 162 may manage the media gateways using the H.248/MEGACO protocol. Other examples of protocols are possible. The media gateway controllers 164 may include a single controller or multiple controllers.

The functions of the SIP proxy 166 may be implemented using computer instructions stored in a memory and executed by a processor. The SIP proxy 166 may forward instructions received from one entity to another entity. The SIP proxy 166 may add an RTP destination to the message that it is forwarding from one entity to another entity. For instance, the SIP proxy 166 may supply an address that it has received from the announcement servers 162 and use this address as the RTP destination address. The address may indicate where the announcement servers 162 are broadcasting announcements.

The IP network 168 may be any type of network used to switch packets of information. For example, it may be the Internet. Other examples of IP networks are possible.

Figure 1C:
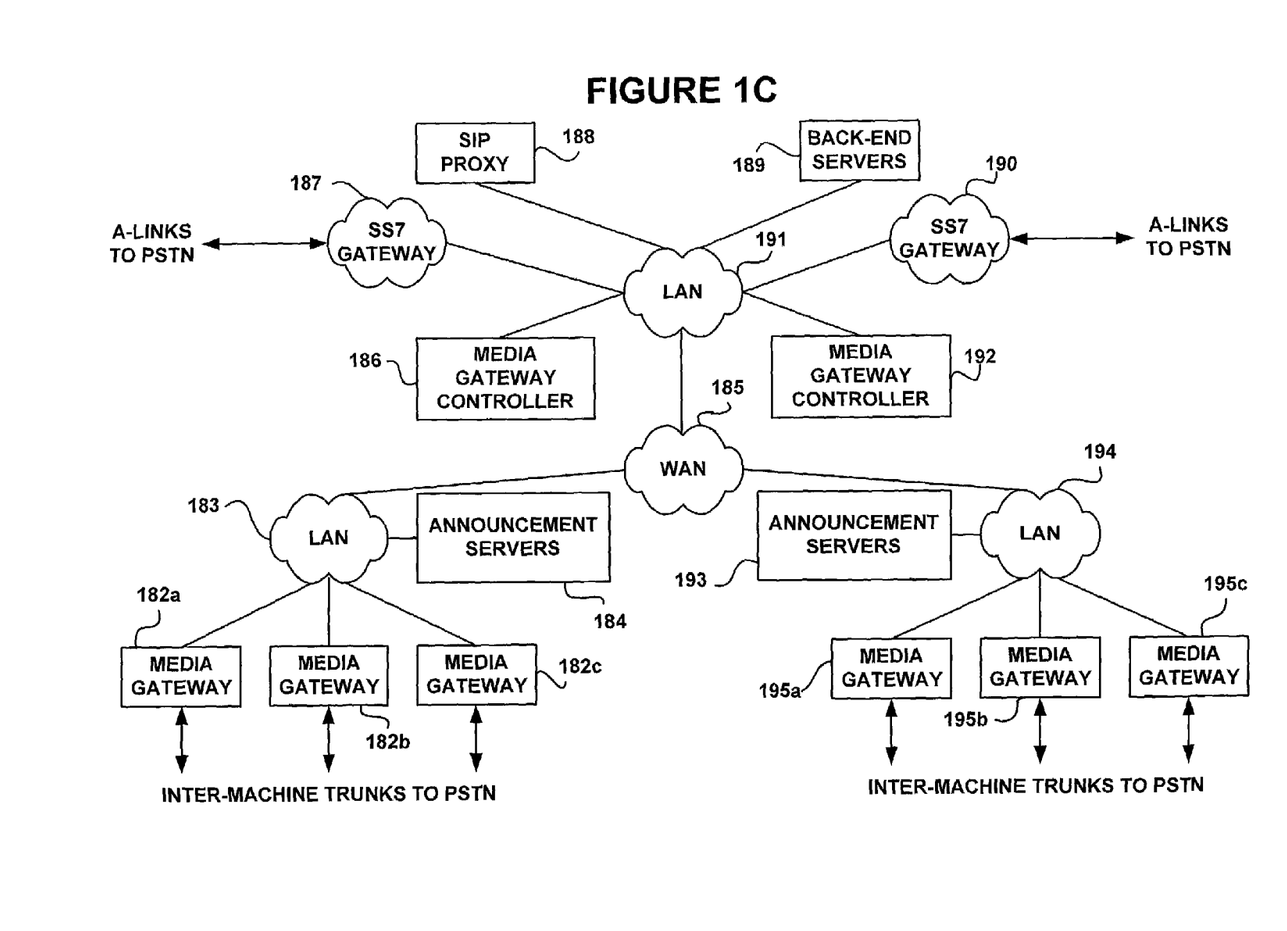
FIG. 1c is a diagram illustrating another example of a system for multicasting information in accordance with the present invention.

Referring now to FIG. 1c, another example of a system for multicasting announcements includes media gateways 182a, 182b, 182c, 195a, 195b, and 195c, local area networks (LANs) 183, 191, and 194, a wide area network (WAN) 185, media gate controllers 186 and 192, a SIP proxy 188, backend servers 189, announcement servers 184 and 193, and SS7 gateways 187 and 190.

The WAN 185 is coupled to the LAN 191, LAN 183, and the LAN 194. The LAN 191 is coupled to the SS7 gateway 187, the SIP proxy 188, the back-end servers 189, the SS7 gateway 190, and the media gateway controllers 186 and 192. The SS7 gateways 187 and 190 are coupled, for example, via A-links, to the PSTN. The LAN 183 is coupled to the media gateways 182a-c, and the announcement server 184. The LAN 194 is coupled to the announcement server 193 and the media gateways 195a-c. The media gateways 182a-c and 195a-c are coupled to the PSTN using, for example, IMTs. The PSTN may be coupled to a plurality of user devices, for example, telephones or computers.

The media gateways 182a, 182b, 182c, 195a, 195b, and 195c may, in one example, terminate DS-3 IMTs from the PSTN. The media gateways 182a, 182b, 182c, 195a, 195b, and 195c may convert circuit-switched voice data (from the IMTs) to packetized voice using Real time Protocol (RTP). The gateways may include VoIP codecs. The VoIP codecs may support various protocols including G.711, G.729a, and T.38. The gateways may be compliant to the decomposed gateway model as proposed in the MEGACO architecture.

The local area networks (LANs) 183, 191, and 194 may be any type of local area network that carries any type of information. In one example, the LANs transmit packetized voice information.

The wide area network (WAN) 185 may be any type of network that carries any type of information. In one example, the WAN 185 transmits packetized voice information.

The functions of the announcement servers 184 and 193 may be implemented using computer instructions stored in a memory and executed by a processor. The announcement servers 184 and 193 may supply addresses to the SIP proxy server 188. The SIP proxy server 188 may use the addresses as RTP destination addresses, which are included in messages sent between user devices coupled to the PSTN. The announcement servers 184 and 193 may also broadcast announcements to addresses. The user devices coupled to the PSTN, and any other device may obtain the announcements at the addresses. For example, a user device coupled to the PSTN may receive messages indicating the address, extract the address, and listen to the announcement at the address. The announcement servers 184 and 193 may be one or multiple servers.

Announcements may include any type of information and be in any format. For example, the announcements may be ring tones, call-routing tones, call-hold tones, invalid destination tones, temporary unavailable tones, number-is-forwarded tones, and number is posted tones. Other examples of announcements are possible.

The announcement servers 184 and 193 may play different tones on different multicast addresses. The recipient of an announcement tone may switch immediately to a different announcement (e.g., a different tone) being played at a different address based upon the progress of a call. The announcement servers 184 and 193 may not have to perform any call setup functions in order for the switch to occur. There is no need for clipping or dead silence before the next announcement is played and there is no delay from the time a signaling state changes and the new announcement is played.

The media gateway controllers 186 and 192 may manage the media gateways 182a-c and 195a-c and may be implemented with computer instructions stored in a memory and executed by a processor. For example, the media gateway controllers 186 and 192 may manage the media gateways using the H.248/MEGACO protocol. Other examples of protocols are possible.

The functions of the SIP proxy 188 may be implemented using computer instructions stored in a memory and executed by a processor. The SIP proxy 188 may forward instructions received from one entity to another entity. The SIP proxy 188 may add an RTP destination to the message that it is forwarding from one entity to another entity. For instance, the SIP proxy 188 may supply an address that it has received from the announcement servers 182a-c or 195a-c and use this address as the RTP destination address. The address may indicate where the announcement servers are broadcasting announcements.

The backend servers 189 may provide the data store for call routing and call authorization related information. The backend servers 189 may consist of directory servers, authentication servers, authorization servers and accounting servers. One purpose of the directory servers may be call routing, i.e. to provide the information about how to reach a particular destination or a dialed number. One purpose of the authentication servers may be to validate the identification of a caller and called party in a call. One purpose of the authorization servers may be to look into the permissions of the caller and called party and allow/deny a call or feature request invoked in a call. The accounting servers may store detailed records concerning calls taking place in a system. Other purposes for these servers are possible.

The SS7 gateways 187 and 190 may convert circuit switched control information from the PSTN into packetized information, which is transmitted across the LAN 191. This function may be implemented by computer instructions stored in a memory and executed by a processor.

The system of FIG. 1c may be used for large carrier deployments. For instance, the LANs 183, 191, and 194 may be at different geographic locations. The announcements and tones that may be provided at each geographic location may differ based on local conditions and requirements. Each of the LANs 183, 191, and 194 is connected externally by the use of the WAN 185. Each of the announcement servers 184 and 193 may provide custom announcements to a geographic location without creating unnecessary traffic over the entire network since the announcements and tones do not travel out of the LAN. The announcement servers 184 and 194 may physically reside outside the media gateways or may co-exist with the media gateways.

Figure 2:
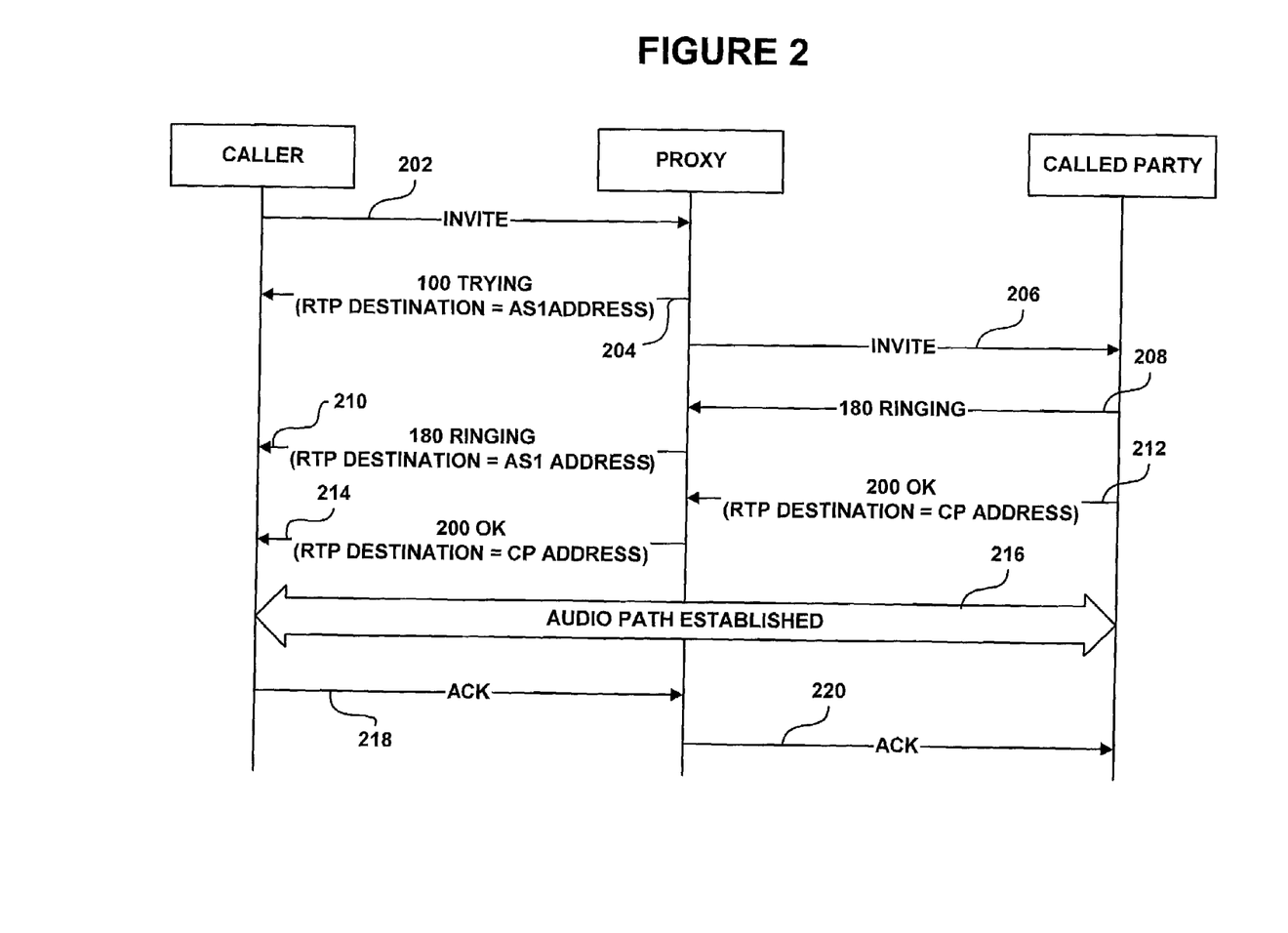
FIG. 2 is a call-flow diagram illustrating multicasting announcements in accordance with a preferred embodiment of the present invention.

Referring now to FIG. 2, one example of multicasting as used in a calling scenario is described. The example uses messages according to the SIP protocol. However, it will be understood that any type of protocol and any type of message format may be used. In this example, a caller device attempts to establish an audio path with a called party device via a proxy. An announcement server is also used to multicast announcements to a memory location ("AS1 Address"). However, any type of communication path may be established and the functionality of the announcement server may be moved to any other suitable location.

At step 202, an INVITE message is sent from the caller device to the proxy. The purpose of the INVITE message is to relay a request from the caller device to establish a communication path (i.e., a call) with the called party device.

At step 204, a "100 Trying" message is sent from the proxy to the caller device. The purpose of this message is to inform the caller party device that the INVITE is being sent from the proxy to the called party device, but that the called party device has not yet been located and has not responded. The proxy may attach the address where announcements are being played from the announcement server. In this case, the address is "AS1 Address." This address may be included as the RTP destination in the "100 Trying" message that is sent to the caller party device. The proxy may receive this address from the announcement server. After receipt, the caller party may listen to the call-routing tone at this address.

At step 206, the INVITE message is sent from the proxy to the called party device.

At step 208, a "180 Ringing" message is sent from the called party device to the proxy. The purpose of this message is to indicate that the called party device has been located and is being notified of the call.

At step 210, the "180 Ringing" message is sent from the proxy to the caller device. The proxy may attach the address where announcements are being played from the announcement server. In this case, the address is "AS1 Address." This address may be included as the RTP destination in the "180 Ringing" message that is sent to the caller party device. The proxy may receive this address from the announcement server. After receipt, the caller party may listen to the ringing tone at this address, which is the same address as where the caller party device listened to the call-routing tone.

At step 212, a "200 OK" message is sent from the called party device to the proxy. The purpose of the "200 OK" message is to indicate that the request (in the INVITE message) has been successfully processed by the called party device. The "200 OK" message may include an RTP destination of CIP address, which is the address of the called party device.

At step 214, the "200 OK" message is sent from the proxy to the caller device. The "200 OK" message may include an RTP destination of CIP address, which is the address of the called party device. At step 216, an audio path is established between the caller device and the called party device.

At step 218, an ACK message is sent from the caller device to the proxy. The purpose of the ACK message is to acknowledge that the audio path has been established between the caller party and the called party device. At step 220, the ACK message is sent from the proxy to the called party device.

Figure 3:
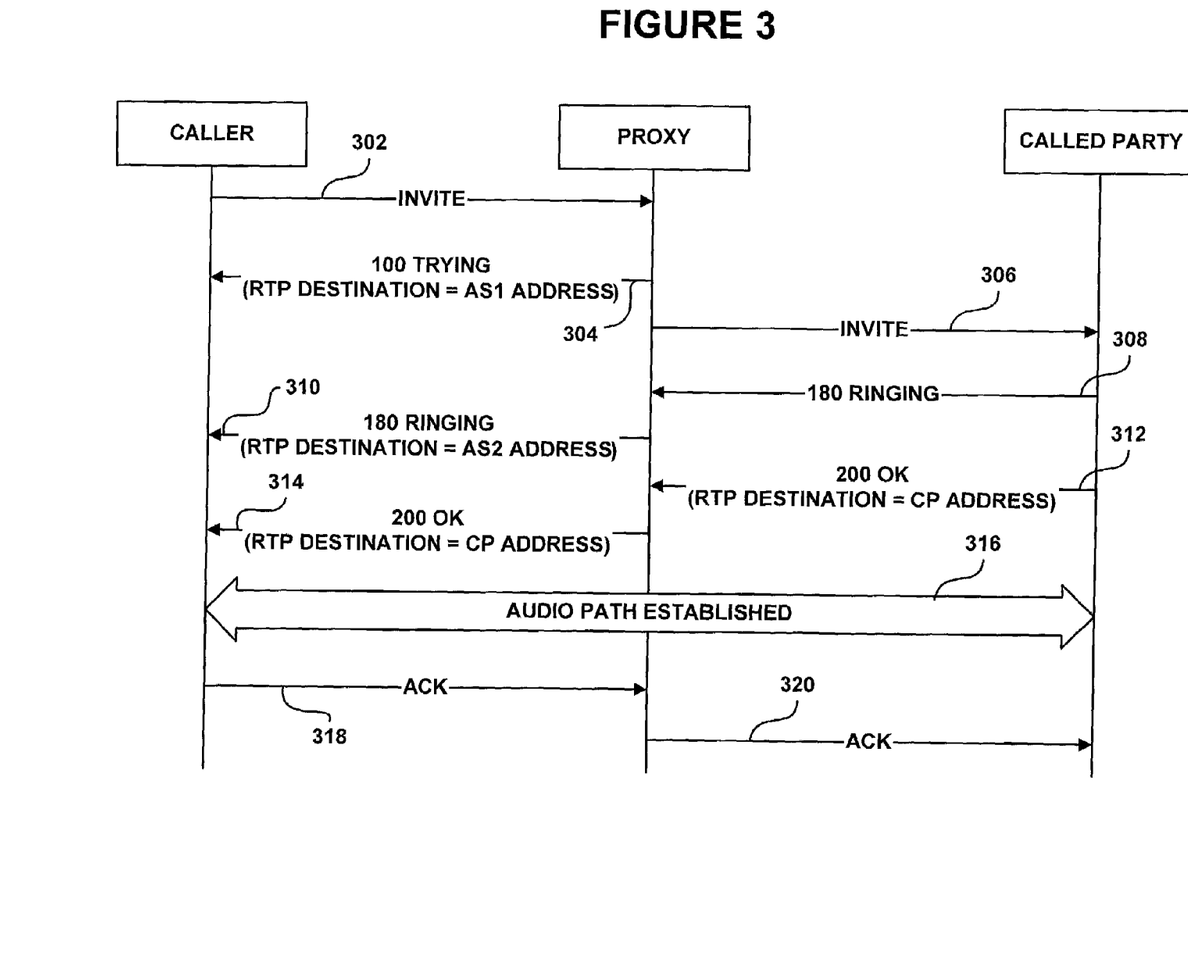
FIG. 3 is a call-flow diagram illustrating multicasting announcements in accordance with a preferred embodiment of the present invention.

Referring now to FIG. 3, another example of multicasting as used in calling is described. The example uses messages according to the SIP protocol. However, it will be understood that any type of protocol and any type of message format may be used. In this example, a caller device attempts to establish an audio path with a called party device via a proxy. An announcement server is also used to multicast announcements to a plurality of memory locations ("AS1 Address" and "AS2 Address"). However, any type of communication path may be established and the functionality of the announcement server may be moved to any other suitable location.

At step 302, an INVITE message is sent from the caller device to the proxy. The purpose of the INVITE message is to relay a request from the caller device to establish a communication path (i.e., a call) with the called party device.

At step 304, a "100 Trying" message is sent from the proxy to the caller device. The purpose of this message is to inform the caller party device that the INVITE is being sent from the proxy to the called party device, but that the called party device has not yet been located and has not responded. The proxy may attach the address where announcements are being played from the announcement server. In this case, the address is "AS1 Address." This address may be included as the RTP destination in the "100 Trying" message that is sent to the caller party device. The proxy may receive this address from the announcement server. After receipt, the caller party may listen to the call-routing tone at this address.

At step 306, the INVITE message is sent from the proxy to the called party device.

At step 308, a "180 Ringing" message is sent from the called party device to the proxy. The purpose of this message is to indicate that the called party device has been located and is being notified of the call.

At step 310, the "180 Ringing" message is sent from the proxy to the caller device. The proxy may attach the address where announcements are being played from the announcement server. In this case, the address is "AS2 Address." This address may be included as the RTP destination in the "180 Ringing" message that is sent to the caller party device. The proxy may receive this address from the announcement server. After receipt, the caller party may listen to the ringing tone at this address, which is a different address than where the caller party device listened to the call-routing tone. In this example, each tone has a different address.

At step 312, a "200 OK" message is sent from the called party device to the proxy. The purpose of the "200 OK" message is to indicate that the request (in the INVITE message) has been successfully processed by the called party device. The "200 OK" message may include an RTP destination of CIP address, which is the address of the called party device.

At step 314, the "200 OK" message is sent from the proxy to the caller device. The "200 OK" message may include an RTP destination of CIP address, which is the address of the called party device. At step 316, an audio path is established between the caller device and the called party device.

At step 318, an ACK message is sent from the caller device to the proxy. The purpose of the ACK message is to acknowledge that the audio path has been established between the caller party and the called party device. At step 320, the ACK message is sent from the proxy to the called party device.

Figure 4:
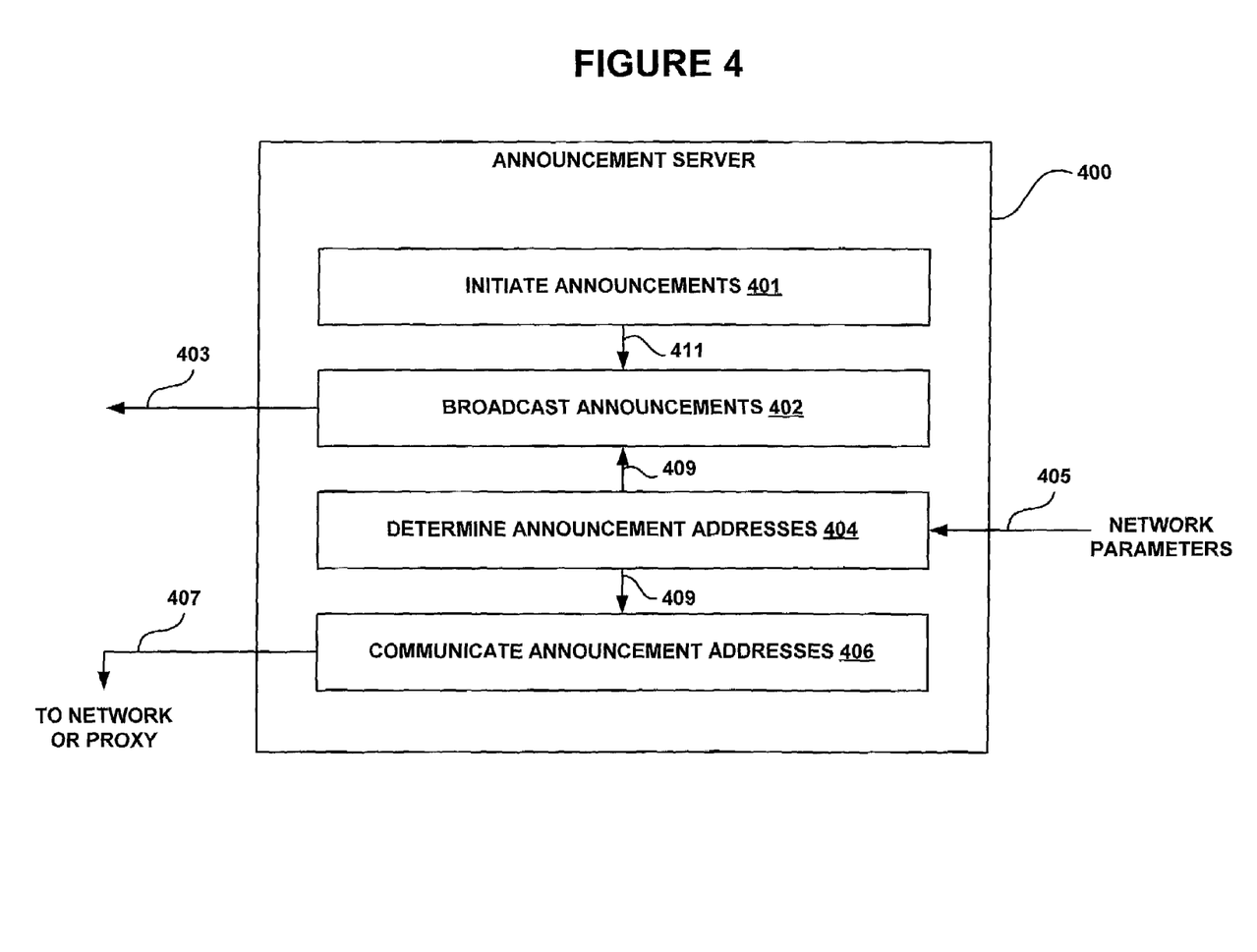
FIG. 4 shows a diagram illustrating one example of an announcement server in accordance with a preferred embodiment of the present invention.

Referring now to FIG. 4, one example of an announcement server is described. An announcement server 400 includes an initiate announcements module 401, a broadcast announcements module 402, a determine announcement address module 404, and a communicate announcement address module 406.

The determine announcement address module 404 receives a network parameters lead 405 and supplies a lead 409 to the communicate announcement address module 406. The communicate announcement address module 406 supplies a lead 407 to a proxy or other network device. The initiate announcements module 401 is coupled to the broadcast announcements module 402.

The initiate announcements module 401 determines when the announcements will be played to an address. This information is communicated to the broadcast announcements module 402 via the lead 409. In one example, announcements may be played continuously. However, other timing examples are possible.

The broadcast announcements module 403 broadcasts announcements to a memory location or memory locations via the lead 403. The memory locations located within the Announcement server and server as bindings between the Announcement Server and the announcement available to external entities via multi-cast addresses. For example, the memory locations may map an audio stream within the announcement server to RTP streams flowing out of the announcement server. Announcements may be in the form of any type of information. For example, the announcements may be ring tones, call-routing tones, call-hold tones, invalid destination tones, temporary unavailable tones, number-is-forwarded tones, and number is posted tones. Other examples of announcements are possible. The addresses are received via a lead 411 from the determine announcement address module 404.

The determine announcement address module determines the address or addresses whereby announcements are played. These addresses are communicated to the broadcast announcements module 402 and the communicate announcement address module 406. A network parameters lead 405 may communicate information that may affect the determination of the address. For example, network usage or memory usage may affect which memory location is used. In other examples, the address or addresses may be determined randomly.

The communicate announcement address module 406 may communicate the addresses determined by the determine announcement address module 404 to any entity that needs these addresses. For instance, a proxy may use these addresses.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the system and method for broadcasting announcements may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system of multicasting announcements, the system comprising:
    a caller device;
    a proxy coupled to the caller device;
    an announcement server, the announcement server coupled to the proxy, the announcement server determining when selected announcements will be played to a plurality of addresses in a memory and broadcasting the selected announcements to the addresses in the memory, the announcement server communicating the plurality of addresses to the proxy;
    wherein the proxy communicates an address of the plurality of addresses to the caller device; and
    wherein the caller device retrieves an announcement from the address.

2. The system of claim 1 wherein the announcement received by the caller device is a tone.

3. The system of claim 1 wherein the caller device switches from receiving a first announcement by listening on a first multicast address to receiving a second announcement of the plurality of announcements by listening on a second multicast address received from the proxy.

4. The system of claim 1 wherein the plurality of announcements transmitted by the announcement server are transmitted according to the Real Time Protocol.

5. A method of multicasting announcements, the method comprising:
    establishing a plurality of multicast addresses;
    forming a plurality of announcements;
    choosing a first multicast address from the plurality of multicast addresses;
    choosing a first announcement from the plurality of announcements;
    transmitting the first multicast address to a caller device via a proxy;
    determining when the first announcement will be transmitted to the first multicast address; and
    transmitting the first announcement to the first multicast address.

6. The method of claim 5 further comprising:

choosing a second multicast address from the plurality of multicast addresses;

choosing a second announcement from the plurality of announcements;

transmitting the second multicast address to the caller device via a proxy;

determining when the second announcement will be transmitted to the second multicast address;

transmitting the second announcement to the second multicast address.

7. The method of claim 6 wherein each of the announcements is a tone.

8. An announcement server comprising:

means for initiating the multicasting of announcements;

means for determining a plurality of addresses to multicast the announcements;

means for determining when the announcements will be transmitted to the addresses;

means for communicating the plurality of addresses to a proxy, the proxy communicating the plurality of addresses to a caller device; and means for multicasting the announcements to the plurality of addresses.

9. The announcement server of claim 8 wherein means for multicasting the announcements to the plurality of addresses includes means for continuously multicasting the announcements to the plurality of addresses.

10. The announcement server of claim 8, further comprising means for a caller device to switch between receiving two announcements.

11. The announcement server of claim 10 further comprising means for communicating an address to a device, and means for retrieving an announcement from the address.

12. The announcement server of claim 8 wherein the announcements are tones.

13. The announcement server of claim 12 wherein a tone used for announcements is a call-ringing tone.

14. The announcement server of claim 12 wherein a tone used for announcements is a call-routing tone.

* * * * *